United States Patent
Murphy

(10) Patent No.: US 11,854,258 B1
(45) Date of Patent: Dec. 26, 2023

(54) ENHANCED RIVER GAUGE

(71) Applicant: X Development LLC, Mountain View, CA (US)

(72) Inventor: Gearoid Murphy, Mountain View, CA (US)

(73) Assignee: X Development LLC, Mountain View, CA (US)

(*) Notice: Subject to any disclaimer, the term of this patent is extended or adjusted under 35 U.S.C. 154(b) by 402 days.

(21) Appl. No.: 17/343,193

(22) Filed: Jun. 9, 2021

Related U.S. Application Data

(60) Provisional application No. 63/049,975, filed on Jul. 9, 2020.

(51) Int. Cl.
  *G06V 20/10* (2022.01)
  *G06F 3/04815* (2022.01)
  (Continued)

(52) U.S. Cl.
  CPC ........ *G06V 20/182* (2022.01); *G06F 3/04815* (2013.01); *G06N 5/04* (2013.01); *G06N 20/00* (2019.01); *G06T 7/579* (2017.01); *G06T 7/73* (2017.01); *G06T 2200/24* (2013.01); *G06T 2207/10036* (2013.01); *G06T 2207/20081* (2013.01); *G06T 2207/30181* (2013.01)

(58) Field of Classification Search
  CPC .... G06V 20/182; G06F 3/04815; G06N 5/04; G06N 20/00; G06T 7/579; G06T 7/73; G06T 2200/24; G06T 2207/10036; G06T 2207/20081; G06T 2207/30181
  See application file for complete search history.

(56) References Cited

U.S. PATENT DOCUMENTS

| 9,058,633 B2 | 6/2015 | Lindores et al. |
| 10,884,123 B2 * | 1/2021 | Smith .................. G01S 7/6263 |

(Continued)

FOREIGN PATENT DOCUMENTS

| CN | 104408900 | 4/2017 |
| JP | 5276927 | 5/2013 |

OTHER PUBLICATIONS

Mojaddadi et al., "Ensemble machine-learning-based geospatial approach for flood risk assessment using multi-sensor remote-sensing data and GIS," Geomatics, Natural Hazards and Risk, Dec. 2017, 8(2):1080-1102.

(Continued)

*Primary Examiner* — Bobbak Safaipour
(74) *Attorney, Agent, or Firm* — Fish & Richardson P.C.

(57) ABSTRACT

Methods, systems, and apparatus for training a machine-learned model using satellite imagery and physical river gauge data as ground-truth information. Methods include receiving, from a user in a graphical user interface presented on a user device, a depth request for depth information at a geolocation. At least two satellite images are received, including the geolocation where a difference in respective capture times of each of the satellite images is within a threshold. The satellite images for the geolocation are provided to a machine-learned river gauge model. The machine-learned river gauge model determines depth information for the geolocation utilizing the satellite images, and provides, to the user in the graphical user interface, the depth information at the geolocation.

20 Claims, 5 Drawing Sheets

(51) Int. Cl.
     *G06N 5/04*     (2023.01)
     *G06N 20/00*     (2019.01)
     *G06T 7/579*     (2017.01)
     *G06T 7/73*     (2017.01)

(56) References Cited

U.S. PATENT DOCUMENTS

| | | | |
|---|---|---|---|
| 2017/0038749 A1 | 2/2017 | Mewes et al. | |
| 2021/0149929 A1* | 5/2021 | Shen | G06F 16/29 |
| 2021/0287393 A1* | 9/2021 | Warnaar | H04N 13/111 |
| 2023/0005258 A1* | 1/2023 | Shinoda | G06V 20/182 |
| 2023/0184735 A1* | 6/2023 | Dong | G01N 33/24 |
| | | | 702/2 |

OTHER PUBLICATIONS

Sarker et al., "Flood mapping with convolutional neural networks using spatio-contextual pixel information," Remote Sensing, Jan. 2019, 11(19):1-25.
Skakun et al., "A neural network approach to flood mapping using satellite imagery," Computing and Informatics, 2010, 29(6):1013-1024.
Tehrany et al., "Identifying the essential flood conditioning factors for flood prone area mapping using machine learning techniques," Catena, Apr. 2019, 175:174-192.

\* cited by examiner

ENHANCED RIVER GAUGE

CROSS-REFERENCE TO RELATED APPLICATIONS

This application claims the benefit under 35 U.S.C. § 119(e) of priority to U.S. Provisional Application Ser. No. 63/049,975, filed on Jul. 9, 2020. The disclosure of the foregoing application is incorporated herein by reference in its entirety for all purposes.

BACKGROUND

Most of the world's rivers lack accurate river depth information. Even in areas where river gauges are deployed, the density of the physical river gauges can be sparse, resulting in incomplete river depth information.

SUMMARY

This specification describes systems, methods, devices, and other techniques relating to training a machine-learned model using satellite imagery and physical river gauge data as ground-truth information. An enhanced river gauge is generated for modeling states of inundation in areas where there may not be local physical river gauges.

In general, one innovative aspect of the subject matter described in this specification can be embodied in a system including a user device and one or more computers operable to interact with the user device and to perform operations of the methods including receiving, from a user in a graphical user interface presented on a user device, a depth request for depth information at a geolocation. At least two satellite images are received including the geolocation, where a difference in respective capture times of each of the satellite images is within a threshold. The at least two satellite images for the geolocation are provided to a machine-learned river gauge model. The machine-learned river gauge model determines depth information for the geolocation utilizing the satellite images, and provides, to the user in the graphical user interface, the depth information at the geolocation.

These and other implementations can each optionally include one or more of the following features. In some implementations the methods further include training the machine-learned river gauge model including generating training data for multiple geographic locations. Generating the training data includes receiving multiple river depth measurements collected by multiple river gauges at respective collection times, where each river gauge of the multiple river gauges corresponds to a respective geographic location. Multiple satellite images are received, where each satellite image includes a geographic location of the multiple geographic locations and is captured at a respective capture time. A first river depth measurement collected by a particular river gauge of a particular geographic location at a first collection time and a second river depth measurement collected by the particular river gauge of the particular geographic location at a second collection time are selected, where a time difference between the first collection time and the second collection time meet a threshold collection period of time. A first satellite image for the first river depth measurement having a respective capture time meeting a first threshold is selected from the multiple satellite images. A second, different satellite image for the second river depth measurement having a respective capture time meeting a second threshold is selected from the multiple satellite images. A set of local inundation characteristics is extracted from the first satellite image and the second satellite image. Training data is generated from the set of local inundation characteristics, the first river depth measurement and the second river depth measurement. The training data is provided to a machine-learned river gauge model.

In some implementations, the satellite images including the geolocation include Landsat images.

In some implementations, determining depth information for the geolocation includes determining a change in depth of a river at the geolocation over a period of time defined by a difference in the capture times of each of the satellite images. The methods can further include determining that the change in depth of the river at the geolocation over the period of time is indicative of a flooding condition, and providing, to the user in the graphical user interface, the depth information at the geolocation including the indication of the flooding condition.

In some implementations, providing the at least two satellite images to the machine-learned river gauge model for the geolocation includes generating a query vector by extracting, from the at least two satellite images, local inundation characteristics. Local inundation characteristics can include changes to appearance of local features in the satellite images, and where extracting local inundation characteristics includes generating an inference about water level changes based on changes to the appearance of local features.

In some implementations, the methods further include receiving, from the user in the graphical user interface presented on the user device, a request for a navigational path along a river having multiple depth characteristics, the navigational path including a start point and an end point. Depth information is determined at each geolocation for a set of geolocations located between the start point and the end point. The navigational path is determined where each geolocation point has an associated depth characteristic meeting a threshold depth. The navigational path is provided. The navigational path can be provided in a map interface in the graphical user interface presented on the user device.

The present disclosure also provides a computer-readable storage medium coupled to one or more processors and having instructions stored thereon which, when executed by the one or more processors, cause the one or more processors to perform operations in accordance with implementations of the methods provided herein.

It is appreciated that the methods and systems in accordance with the present disclosure can include any combination of the aspects and features described herein. That is, methods and systems in accordance with the present disclosure are not limited to the combinations of aspects and features specifically described herein, but also include any combination of the aspects and features provided.

Particular embodiments of the subject matter described in this specification can be implemented so as to realize one or more of the following advantages. An advantage of this technology is that changes in river depth can be determined without a physical gauge present at the particular location of the river, such that depth information can be extracted in remote areas and over a broader region of the river not including the physical gauge. A global model of hydrological water flow can be built with reasonable accuracy to know how much precipitation is being experienced in a particular region. The model can be utilized to predict in advance how a body of water will behave based on meteorological forecasts. Depth understanding and predictive measurements can be made using the model for a new body of water not included in the training data. A substantial number of training images and gauge measurements can make the model invariant to atmospheric conditions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

The technology of this patent application generally utilizes a machine-learned model to generate an enhanced river gauge for modeling states of inundation in areas where there may not be local physical river gauges, and more particularly can be used to better understand river depth changes at a geographic location, also referred to as a geolocation.

More particularly, the technology of this application uses imaging data, e.g., Landsat images, synthetic aperture radar (SAR) images, etc., and local river gauge measurements, e.g., depth gauge measurements and flow gauge measurements, to generate training data, that is used to train a machine-learned model that can determine a delta change in local river depth based on successive Landsat images.

Each river gauge measurement is paired with at least one Landsat image collected within a threshold amount of time of the river gauge measurement. Landsat images corresponding to a successive pair of river gauge measurements are provided to the model, where the river gauge measurements are utilized as ground truth. The system extracts features from the Landsat images to characterize a local state of inundation of the region captured by the Landsat images including the body of water, e.g., rocks that have been covered by water, plants, relative levels of the water to large features such as rocks, trees, etc., coast line appearance, texture changes, color, sand/dirt appearance, and the like, to determine imaging cues representative of the delta change in river depth corresponding to the river gauge measurements. The extracted features and river gauge measurements are provided to the river gauge model as training data. The trained river gauge model can then be utilized as an enhanced "virtual" river gauge to determine a change in depth for a particular region over a range of time (not included in the original training data) based on successive Landsat images (or the like) collected of the particular region.

The system can further include a graphical user interface (GUI), through which a user may request river depth information for a given geolocation. The GUI can include a map interface which can display pin point estimations of depth variation for a region of the map interface, e.g., water depth variation along a stretch of a river. In one embodiment, a user may provide start and end points on a waterway e.g., river, lake, channel, and (optionally) a minimum depth, e.g., as determined by a craft being used, and the system can scan multiple points along a path to determine if there is sufficient depth for passage and/or suggest a passable path.

Applications for this technology include river navigation systems, dam/spillway management, automated flood warnings, fishing regulation, and automated irrigation systems.

Example Operating Environment

Figure 1:
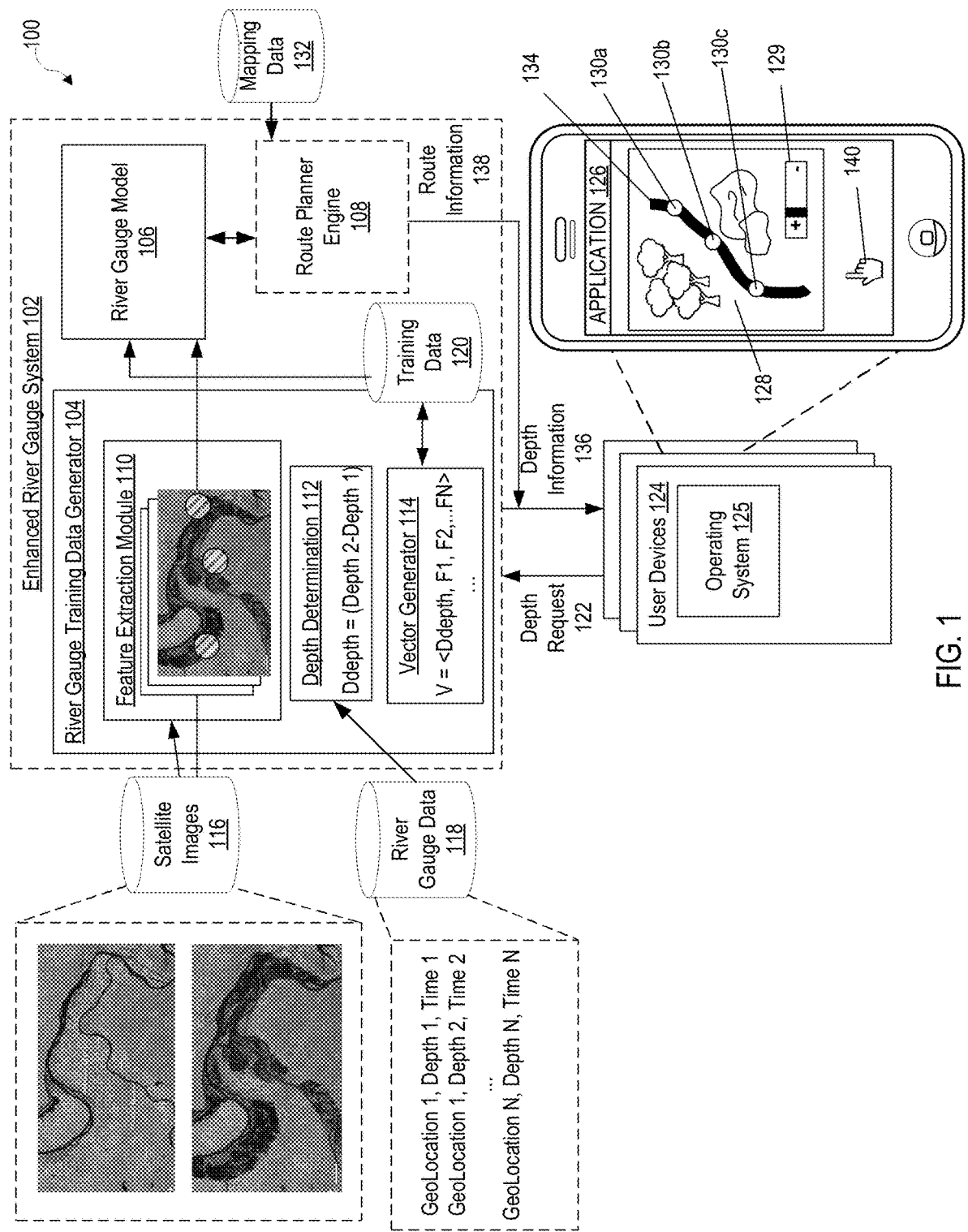
FIG. 1 is a block diagram of an example operating environment of an enhanced river gauge system.

FIG. 1 is a block diagram of an example operating environment 100 of an enhanced river gauge system 102. Enhanced river gauge system 102 can be hosted on one or more local servers, a cloud-based service, or a combination thereof.

Enhanced river gauge system 102 can be in data communication with a network, where the network can be configured to enable exchange of electronic communication between devices connected to the network. The network may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications (e.g., data or voice communications). For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may be a wireless network, a broadband network, or a combination of networks including a wireless network and a broadband network.

The enhanced river gauge system 102 includes a river gauge training data generator 104 and river gauge model 106. Optionally, the enhanced river gauge system 102 includes a route planner engine 108. Though described herein with reference to a river gauge training data generator 104, river gauge model 106, and route planner engine 108, the operations described can be performed by more or fewer sub-components.

The river gauge training data generator 104 includes a feature extraction module 110, a depth determination module 112, and a vector generator 114. The river gauge training data generator 104 receives satellite images 116 from a repository of satellite images and river gauge data 118 as input, and provides training data 120 as output.

Satellite images 116 include any images capturing a geographical region and providing topographical information for the geographical region. Satellite images can be, for example, Landsat images, synthetic aperture radar (SAR) images. The satellite images 116 can be, for example, RGB images or hyperspectral images. Satellite images 116 can be captured using satellite technology, e.g., Landsat. In some implementations, satellite images can be captured using other high-altitude technology, e.g., drones, weather balloons, planes, etc.

In some implementations, satellite images may be captured utilizing radar-based imaging and/or depth sensitive imaging techniques, for example, LiDAR images, RADAR images, or another type of imaging using the electromagnetic spectrum, or a combination thereof. Satellite images 116 can include images of geographic regions including various different terrains, vegetation, bodies of water, and other features. For example, a first set of satellite images 116 can include images of a geographic region including a river and a flood plain. In another example, a second set of satellite images 116 can include images of another geographic region including rocky shore and a portion of a lake.

River gauge data 118 includes information collected by multiple river gauges deployed at multiple geolocations. River gauges can include, for example, depth gauges and flow meters, which are physically located at or within different bodies of water. The multiple satellite images can be captured, for example, every few hours, every day, every couple of weeks, etc., such that the captured satellite images include information about changes to the geographic region included in the satellite image 116. The captured satellite images for the geographic region can be captured under multiple weather conditions, lighting conditions, and the like, such that the effects of the various capture conditions on an appearance of the geographic region are understood.

Though described here with reference to river-based measurements and collection gauges, the data collected should be understood to be applicable to any body of water, e.g., ocean, lake, bayou, irrigation channels, reservoir, etc. River gauge data 118 can be collected from respective physical gauges periodically, e.g., every hour, every two days, once a week, etc., where each measurement reflects a state of the river at the time of collection. River gauge data 118 for a particular gauge can include a geolocation, a depth measurement, and a timestamp of the collection for the depth measurement.

The river gauge training data generator 104 can receive multiple measurements from river gauge data 118, each corresponding to a measurement made by a river gauge located at a particular geolocation and at a point in time, e.g., Geolocation 1, D1, T1, as depicted in FIG. 1. The river gauge training data generator 104 can additionally receive multiple satellite images 116 for each of multiple geographic locations of the river gauges, where the multiple satellite images are captured at points in time that are within a threshold amount of time as the collection times of the river gauge measurements collected by the river gauges. Further details of the selection of satellite images 116 corresponding to each measurement from river gauge data 118 is discussed with reference to FIG. 4.

Feature extraction module 110 can receive the satellite images 116 as input and provide local inundation characteristics F1, F2, . . . FN, as output to the vector generator module 114. Each local inundation characteristic is descriptive of a state of inundation of the bodies of water depicted within the respective satellite image 116. Further details of the feature extraction is discussed with reference to FIG. 2.

Depth determination module 112 receives, as input, at least two depth measurements from the river gauge data, D1 and D2, which are collected by a particular river gauge at a geolocation, e.g., Geolocation 1, at two points in time, e.g., T1 and T2. In some implementations, a first collection time T1 and a second collection time T2 are within a threshold collection period of time. Depth determination module 112 provides a delta change in depth as output to the vector generator module 114.

Vector generator module 114 can receive extracted local inundation characteristics from the feature extraction module 110 and a delta change in depth from the depth determination module 112 as input. Depth measurements from the river gauge data 118 can be used as ground truth in the training data 120. Vector generator 114 can generate training data 120 from the extracted local inundation characteristics and the delta change in depth, e.g., training vectors V. Further details of the generation of training data is discussed with reference to FIG. 5.

River gauge model 106 can receive training data 120 as input to train the machine-learned model using the training data 120. In some implementations, river gauge model 106 can be trained using a substantial number of training vectors generated using a large sample of different geolocations and depth measurements from river gauges located at each geolocation. In one example, many thousands of geolocations can be included in the training data 120 provided to the river gauge model 106.

Enhanced river gauge system 102 can receive, as input, a depth request 122 from a user device 124. User device 124 can include, for example, a mobile phone, tablet, computer, or another device including operating system 125 and an application environment 126 through which a user can interact with the enhanced river gauge system 102. In one example, user device 124 is a mobile phone including an application environment 126 configured to display a mapping window 128.

Depth request 122 can include one or more geolocations 130a, 130b, 130c, indicated by a user of the user device 124. Locations of interest 130a-c can include a respective geolocation, e.g., GPS coordinates, and can be defined by the user by the geolocation and/or indicated in the mapping window 128. Application environment 126 can access mapping data 132 and present a map of a geographic region within the mapping window 128 for the user to view and interact with.

Depth request 122 can further include a time of interest or range of time of interest, e.g., a point in time or range in time at which the user is seeking depth information. For example, a user may be interested in a current depth information. In another example, a user may be interested in historical depth information over a period of time, e.g., previous 3 months, in a particular date over multiple years, or the like.

In some implementations, a depth request 122 includes a general geographic region including a body of water 134, e.g., a river, stream, flood plain, etc., where the depth request includes a request for depth information for the region including the body of water 134.

Mapping window 128 can be configured to enable interactive options 129, for example, zoom, pan, etc., to allow the user to define a route of travel and request depth information along the defined route. In one example, interactive options 129 allow for a user to indicate points of interest 130a-c by selecting 140 on a touch screen or clicking with a mouse within the mapping window 128.

Enhanced river gauge system 102 receives the depth request 122 as input and provides depth information 136 as output to the user device 124. Depth information 136 can include a delta change in depth at a geolocation 130a over a period of time, e.g., 2 weeks, 1 hour, 1 month, etc. In some implementations, depth information 136 can include absolute depth at the geolocation 130a, or an estimate of absolute depth within a range of depth, e.g., 5 feet±1.5 feet.

In some implementations, enhanced river gauge system 102 receives as input a depth request 122 including a requested route along a body of water 134. Route planner engine 108 can receive the request for a route and generate, based on mapping data 132 and depth information 136 at various points of interest 130a-c along body of water 134, a route for traversing the body of water 134. Enhanced river gauge system 102 can provide route information 138 including a navigational path as output. In some implementations, the route information 138 can be provided to a mapping or navigational application on user device 124, e.g., a mobile device, a navigational computer on a vessel, etc., and/or can be provided to a navigational functionality of a same application 126.

Feature Extraction

Figure 2:
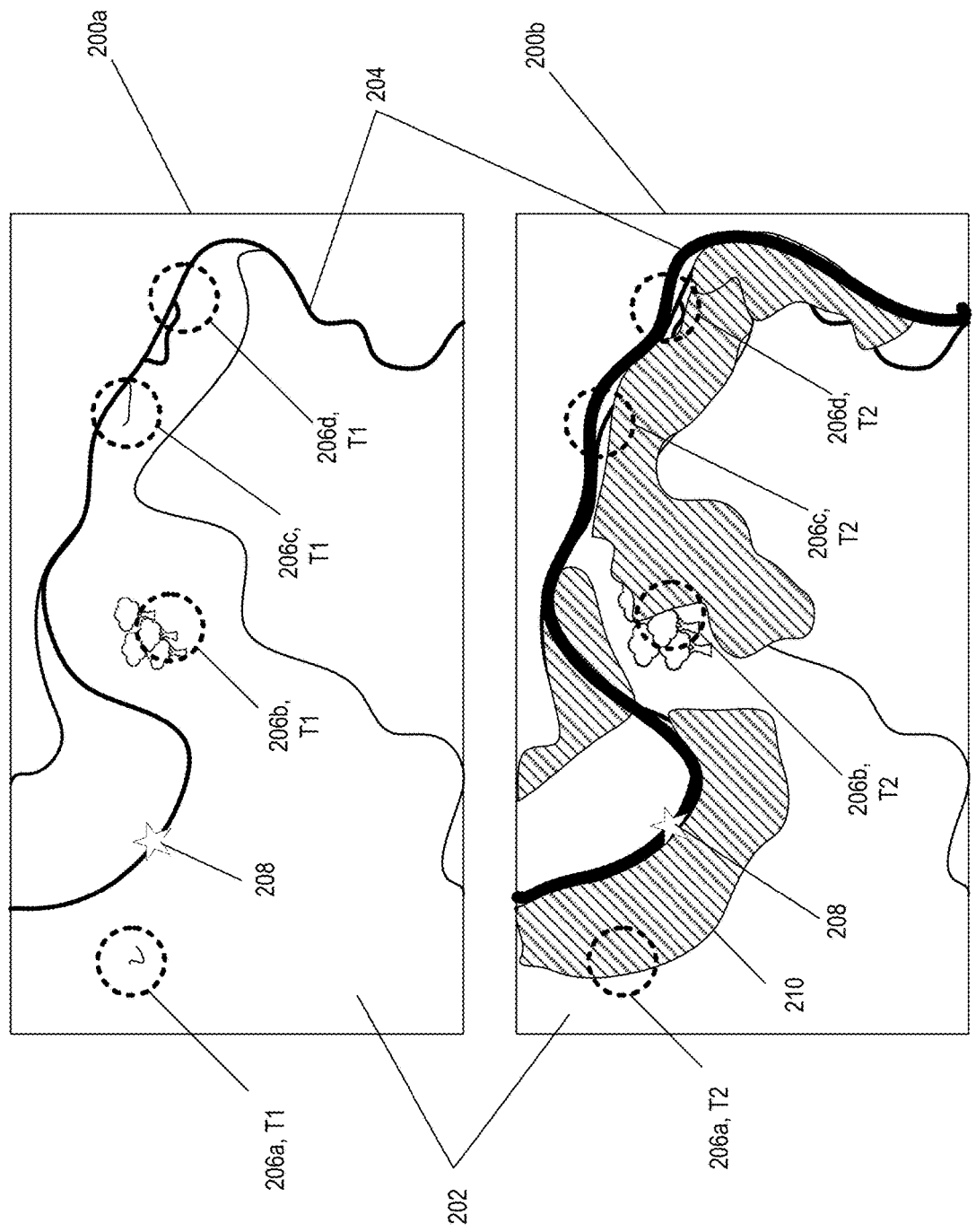
FIG. 2 is a schematic of an example pair of satellites images including local inundation characteristics.

As discussed above with reference to FIG. 1, feature extraction module 110 can receive satellite images 116 from a repository of satellite images 116, e.g., Landsat images, as input and extract local inundation characteristics. FIG. 2 is a schematic of an example pair of satellites images including local inundation characteristics. Satellite images 200a and 200b are captured at capture times T1 and T2, respectively, and can be selected based on collection times T1' and T2' of respective river gauge measurements, D1 and D2, by river gauge 208.

Satellite images 200a and 200b depict a same geographic region 202 including a body of water 204, and a set of features 206a-d. Satellite images 200a and 200b are each captured at T1 and T2, respectively, where a difference between T1 and T2 can be, for example, 2 weeks. Each of the features 206a-d is identified in the respective satellite images 200a, 200b. Geographic region 202 includes a river gauge 208 that is located within body of water 204, e.g., a river depth gauge.

River gauge 208 can collect depth measurements at the geolocation of the river gauge 208 within the body of water 204 at collection times T1' and T2', where T1' and T2' are separated by an amount of time, e.g., 1 hour, 2 days, 1 week, etc. As described in detail below with respect to FIGS. 4 and 5, satellite images 200a and 200b can be selected based on their respective capture times T1 and T2 each being within a threshold amount of time from collection times T1' and T2', respectively.

Features 206a-d can be extracted from each of the satellite images 200a and 200b, where an appearance of each the features 206a-d can change between the two satellite images 200a, 200b that are captured a period of time apart, e.g., at T1 and T2, respectively. The differences in the appearances of the features 206a-d between T1 and T2 can be utilized as local inundation characteristics for body of water 204 in geographic region 202. In other words, local inundation characteristics are imaging cues reflective of a change in depth measured by river gauge 208 between collection times T1' and T2'.

Differences in the appearance of features can be, for example, rocks that have been covered by water, plants, relative levels of the water to large features such as rocks, trees, etc., coast line appearance, texture changes, color, sand/dirt appearance, and the like. As depicted in FIG. 2, feature 206a is seen at T1 in satellite image 200a and is subsequently covered by flood water 210 at T2 in satellite image 200b. Feature 206b depicts a position of water level of body of water 204 with respect to a cluster of trees between T1 in satellite image 200a, e.g., no water present, and T2 in satellite image 200b, e.g., flood water 210 is partially covering the cluster of trees. Feature 206c depicts a change in shoreline/coastline between T1 of satellite image 200a and T2 of satellite image 200b. Feature 206d depicts a tributary/river runoff merging into a main flow of the body of water 204 between T1 and T2 of the respective satellite images.

Example Processes of the Enhanced River Gauge

Figure 3:
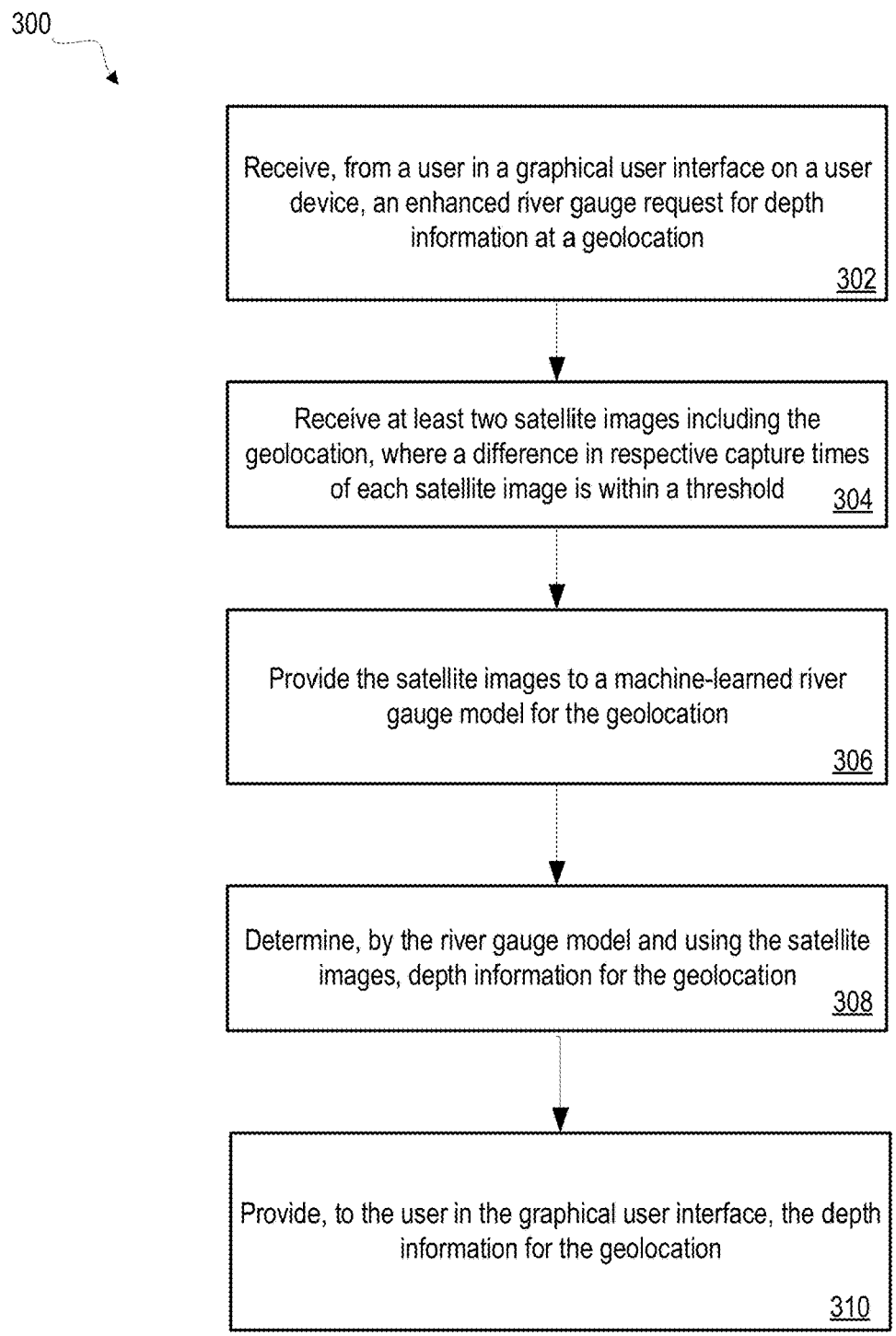
FIG. 3 is a flow diagram of an example process of the enhanced river gauge system.

FIG. 3 is a flow diagram of an example process 300 of the enhanced river gauge system. The enhanced river gauge receives a request for depth information at a geolocation from a user in a graphical user interface on a user device (302). A graphical user interface displayed on a user device, e.g., application environment 126 on user device 124, can include a mapping window 128 depicting a geographic region including a body of water 134. A depth request 122 can be received from a user, where the depth request 122 includes a request for depth information, e.g., a delta change in depth or an absolute depth measurement, for the particular geolocation. User of user device 124 can indicate, e.g., by selecting or clicking 140, on a particular geolocation 130a displayed in the mapping window 128. Geolocation 130a can be a location on a body of water 134 as defined by a GPS coordinate. In some implementations, geolocation 130a can be a location including an area surrounding a GPS coordinate, e.g., a 50 meter radius surrounding a GPS coordinate, a 2 square meter area surrounding a GPS coordinate, or the like.

The depth request 122 can further include a range of time for the depth information. For example, the user can request current depth information. In another example, the user can request historical depth information, e.g., how depth at the geolocation 130a has changed over a period of time.

In some implementations, a depth request 122 can include a request for flooding information for a particular geolocation 130a or set of geolocations 130a-c. Flooding information can include information about flood zones, seasonal flooding patterns, etc. Depth request 122 can include a request for flooding information covering a geographic region, e.g., a square mile area indicated by the user in the mapping window 128.

In some implementations, a depth request 122 can be made for a geolocation 130a that does not have a river gauge present in the body of water including the geolocation 130a. Additionally, the geolocation 130a may not be included in satellite images 116 utilized in an initial generation of training data 120 for training the river gauge model 106. In other words, the depth request 122 can be made for a geolocation 130a that the river gauge model 106 may not have encountered previously. For example, the geolocation 130a may be in a remote area or an area not including physical river gauges in the body of water 134 including the geolocation 130a.

At least two satellite images including the geolocation are received, where a difference in respective capture times of each satellite image is within a threshold (304). Satellite images, e.g., satellite images 116, are received by the enhanced river gauge system 102 from a repository of satellite images, e.g., a Landsat repository. Each satellite image 116 has a respective capture time, TN, corresponding to a time that the image was captured. Satellite images 116 are selected that include the geolocation 130a, where a difference in capture times between the two satellite images is within a threshold capture time. In one example, a threshold capture time is 2 weeks. In another example, a threshold capture time is 1 hour. A threshold capture time can depend part on availability of satellite images, where the threshold can be set based on a frequency of capture by a satellite of the geolocation. In other words, if a Landsat satellite captures an image of the geolocation 130a every 2 hours, then a threshold capture time can be set at 2 hours.

In some implementations, satellite images 116 are selected to be sequentially captured images, that is, images including the geolocation that are captured sequentially by a Landsat satellite.

In some implementations, satellite images 116 are selected based on capture times for the respective satellite images 116 that are within a threshold amount of time from a range of time or point in time included in the depth request 122. For example, if the depth request 122 includes a request for current depth information, satellite images 116 can be selected based on having respective capture times that are within 2 weeks of the current date and time. In another example, if the depth request 122 includes a request for historical depth information for a range of time, satellite images 116 can be selected based on having respective capture times that are within 2 days of the range of time or are within the range of time.

The satellite images are provided to a machine-learned river gauge model for the geolocation (306). River gauge model 106 can receive the satellite images 116. River gauge model 106 can be trained using training data 120, as described in further detail with reference to FIG. 5, such that the river gauge model 106 can receive the satellite images 116 as input and provide depth information 136 as output.

In some implementations, providing the satellite images for the geolocation to the river gauge model includes generating a query vector by extracting, from the satellite images, local inundation characteristics. Local inundation characteristics can be extracted by changes in appearance in features identified in a pair of satellite images, e.g., features 206a-d in satellite images 200a and 200b. In some implementations, the pair of query satellite images to form the query vector are of a same type, e.g., Landsat images, as the type of images used to generate the training data.

Depth information for the geolocation is determined by the river gauge model and using the satellite images (308). River gauge model 106 can receive two satellite images 116 including the geolocation 130a, where each satellite image is captured at a respective capture time T1, T2, and, from the local inundation characteristics, make an inference about a change in depth at the geolocation. The river gauge model 106 can utilize internal heuristics to make the inference.

In some implementations, determining depth information for the geolocation includes determining a change in depth of a river at the geolocation over a period of time defined by a difference in the capture times of each of the satellite images.

The depth information for the geolocation is provided to the user in the graphical user interface (310). Depth information 136 can be provided to the user in application environment 126, e.g., in mapping window 128. In one example, depth information 136 can be provided for each of the geolocations 130a, 130b, 130c indicated in the mapping window 128. Depth information can include a delta change in depth for the geolocation 130a and/or an absolute or estimated range of the depth of the body of water 134 at the geolocation.

In some implementations, depth information 136 can be provided to a navigational system, e.g., for a boat. Depth information 136 can be provided to a navigational system that includes an autopilot functionality to assist the autopilot in performing one or more functions.

In some implementations, depth information 136 can be provided to one or more automated or semi-autonomous control systems, e.g., systems that control dams/spillways, locks, etc. For example, depth information 136 can be provided to a control system that regulates a level of a dam in order to trigger opening of a spillway. In another example, depth information 136 can be provided to an irrigation system in order to regulate irrigation controls, e.g., when to increase/decrease artificial watering systems.

In some implementations, depth information 136 can be provided to one or more regulatory systems, e.g., fishing regulatory boards, national/state park service, boating/recreation management, or the like, to assist in creating and maintaining standards for a geographic region including a body of water 134. In one example, a wildlife/fishing regulatory board can use historical depth information 136 to track and regulate permissible fishing areas in body of water 134.

In some implementations, the processes of FIG. 3 further includes determining that a change in depth of the river at the geolocation over the period of time is indicative of a flooding condition. In response, the system can provide, to the user in the graphical user interface, the depth information at the geolocation including the indication of the flooding condition. For example, the system 102 can provide flood alerts to one or more users of user devices 124, e.g., residents within a flood zone of geolocation 130a.

In some implementations, the processes of FIG. 3 can additionally or alternatively include further actions including: receiving, by the system and from the user in the graphical user interface presented on the user device, a request for a navigational path along a river having multiple depth characteristics, the path including a start point and an end point. For a set of geolocations located between the start point and the end point, depth information is determined at each geolocation. The navigational path is determined, where each geolocation point has an associated depth characteristic meeting a threshold depth. The navigational path is provided to the user in the graphical user interface on the user device.

Figure 4:
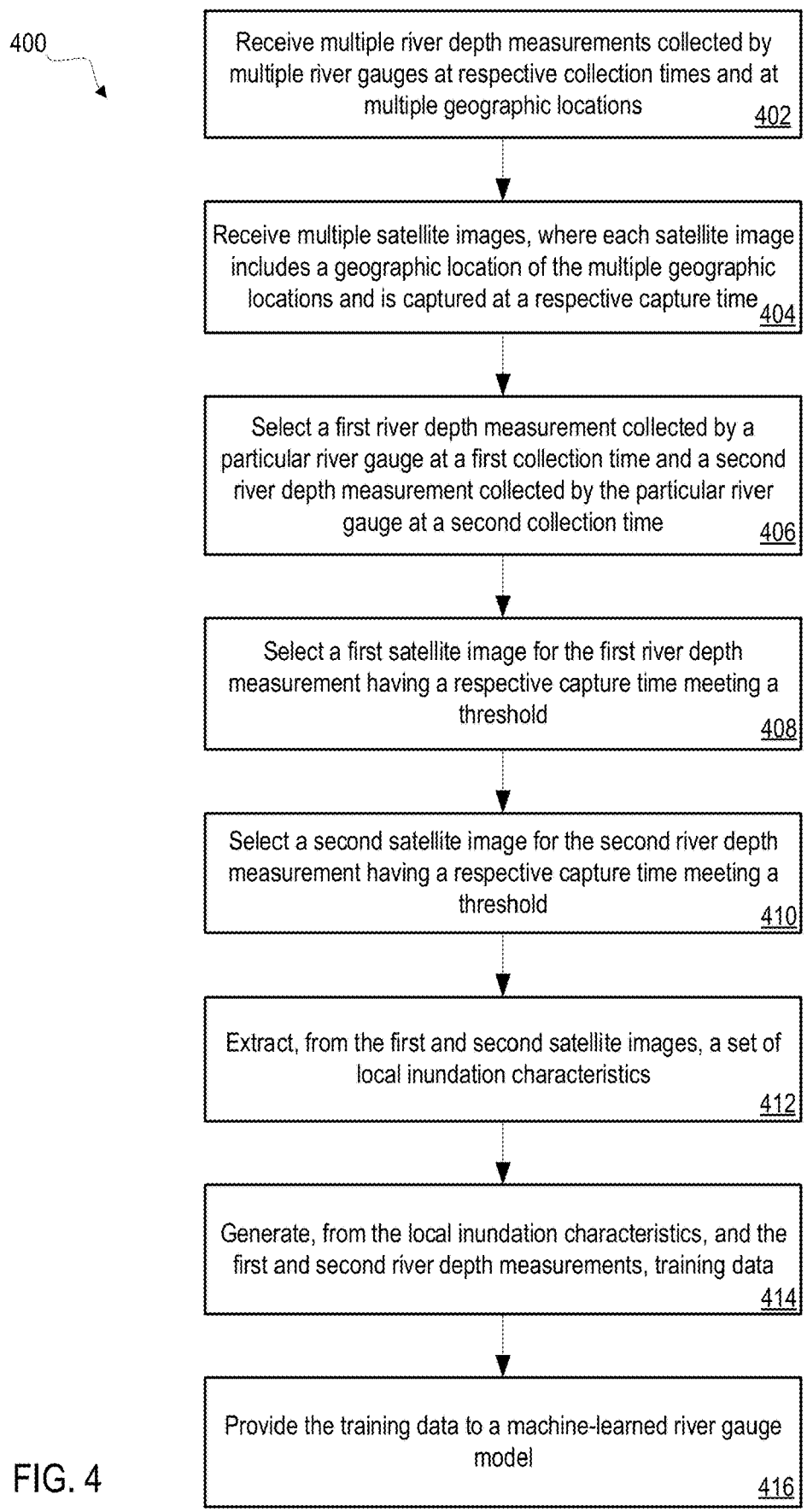
FIG. 4 is a flow diagram of another example process of the enhanced river gauge system.

Training the machine-learned river gauge model 106 includes generating of training data 120 including a large sample set of satellite images and river gauge measurements, e.g., several thousand images and measurements. The generating training data can be representative of various imaging conditions, e.g., atmospheric conditions, weather conditions, lighting conditions, etc., to generalize the river gauge model 106 trained on the training data 120 to develop heuristics for a wide range of topology and imaging conditions. FIG. 4 is a flow diagram of another example process 400 of the enhanced river gauge system. Multiple river depth measurements collected by multiple river gauges at respective collection times and at multiple geographic locations are received (402). River gauges, e.g., river gauge 208, can be located in and/or around a body of water 204. River gauges are physical measurement devices that measure a property of a body of water, for example, depth gauges, wave monitoring devices, flow meters, or the like. River depth measurements can be collected by the multiple river gauges at various geographic locations and provided to river gauge data 118. Each river depth measurement can include a geolocation of the gauge, a depth measurement, and a collection time, e.g., Geolocation 1, D1, T1.

Multiple satellite images are received, where each satellite image includes a geographic location of the multiple geographic locations and is captured at a respective capture time (404). Satellite images 116, e.g., Landsat images, are received from a repository of collected images. Each satellite image includes a capture time, e.g., T1', when the image was captured. Each satellite image 116 captures a geographic region at a particular resolution and includes location information, e.g., GPS coordinates, defining the geographic region captured within the frame of the image.

A first river depth measurement collected by a particular river gauge at a first collection time is selected and a second river depth measurement collected by the particular river gauge at a second collection time is selected (406). The collection times T1 and T2 for the respective river depth measurements are selected to be within a threshold time difference, e.g., a time difference of 2 weeks. In one example, the river depth measurements are selected such that T2−T1 is less than a threshold time difference of 2 hours.

A first satellite image for the first river depth measurement is selected having a respective capture time meeting a threshold (408). Satellite images 116 are selected corresponding to each received river gauge measurement, where a capture time T1' is within a threshold time of the collection time T1 of the corresponding river gauge measurement and the satellite image includes a geolocation of the particular river gauge that collected the first river depth measurement. Threshold time can be an amount of time before, after, or a range of time including the collection time. For example, capture time T1' is within ±2 hours of collection time T1. In another example, capture time T1' is within 1 day after collection time T1. In yet another example, capture time T1' is within 1 week before collection time T1.

A second satellite image for the second river depth measurement is selected having a respective capture time meeting a threshold (410). Satellite images 116 are selected corresponding to each received river gauge measurement and including the geolocation of the particular river gauge that collected the respective river gauge measurement, where a capture time T2' is within a threshold time of the collection time T2 of the corresponding river gauge measurement. Threshold time can be an amount of time before, after, or a range of time including the collection time. For example, capture time T2' is within ±2 hours of collection time T2. In another example, capture time T2' is within 1 day after collection time T2. In yet another example, capture time T2' is within 1 week before collection time T2.

A set of local inundation characteristics is extracted from the first and second satellite images (412). Local inundation characteristics can include changes to appearance of local features in the satellite images. Local features, e.g., local features 206a-d, can be identified in the first and second satellite images, e.g., satellite images 200a and 200b, where the appearance of each respective feature 206a-d between T1 and T2 is utilized to extract local inundation characteristics. Extracting local inundation characteristics from the satellite images can include generating an inference about water level changes based on changes to appearance of the local features. For example, a relative level of water to a boulder, a cluster of trees, a shoreline, and/or a flood zone, can each be utilized to generate an inference about water level changes corresponding to a delta change in depth at a geolocation.

Training data is generated from the local inundation characteristics and the first and second river depth measurements (414). Generating training data can include generating training vectors including the depth measurements from the river gauges at a particular geolocation as ground truth and the extracted local inundation characteristics from satellite images including the particular geolocation.

The training data is provided to a machine-learned river gauge model (416). The training data 120 is provided to a machine-learned river gauge model 106 to train the river gauge model 106 to make inferences about depth information at a geolocation based on receiving at least two satellite images 116 collected at T1 and T2 and including the geolocation within the frame of the images.

In some implementations, the training data 120 can include meteorological data, e.g., weather patterns, rain flow, drought levels, mountain snow run-off, etc., to train the river gauge model 106 to predict hydrological water flow. In other words, a model can be trained to receive an amount of input precipitation and predict effects to bodies of water, e.g., flooding, monsoon, etc.

Figure 5:
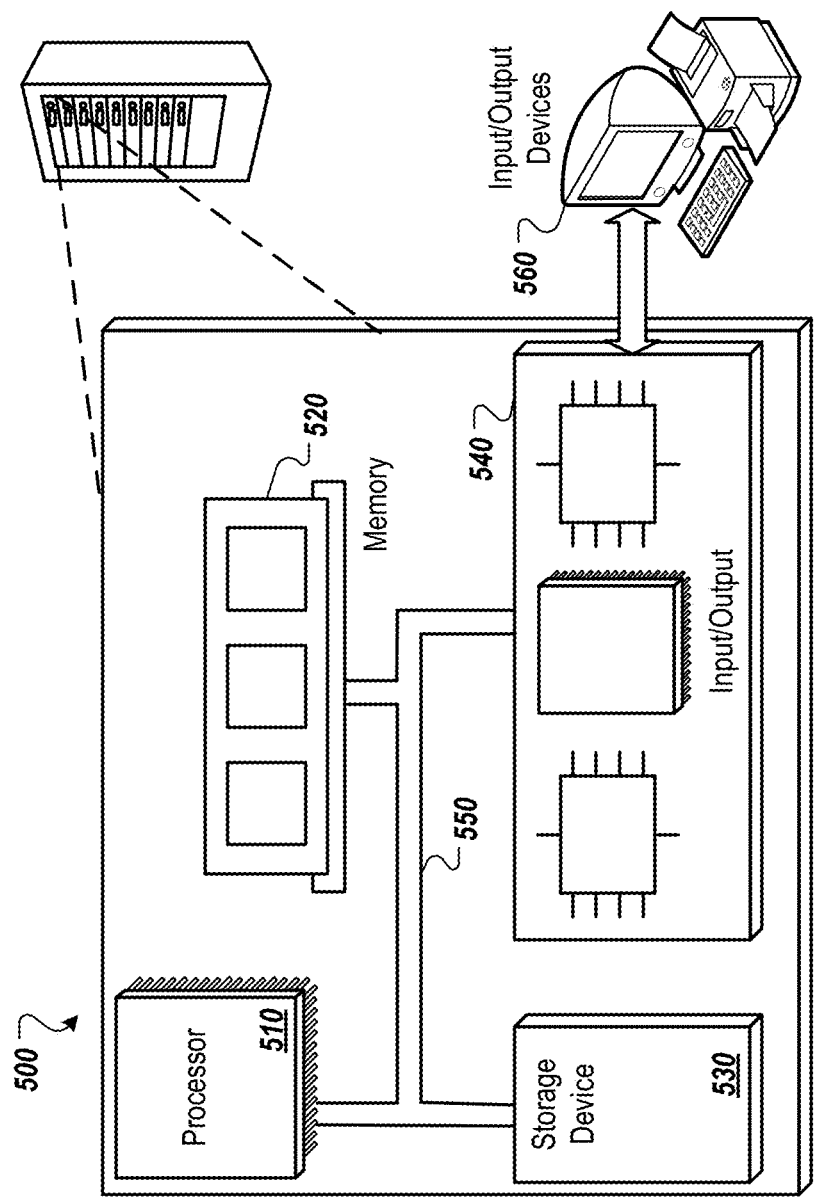
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (for example, a cloud storage device), or some other large capacity storage device.

The input/output device 540 provides input/output operations for the system 500. In one implementation, the input/output device 540 can include one or more network interface devices, for example, an Ethernet card, a serial communication device, for example, a RS-232 port, and/or a wireless interface device, for example, a 502.11 card. In another implementation, the input/output device can include driver devices configured to receive input data and send output data to other input/output devices, for example, keyboard, printer and display devices 560. Other implementations, however, can also be used, such as mobile computing devices, mobile communication devices, set-top box television user devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The non-transitory computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a user device; and
one or more computers operable to interact with the user device and to perform operations comprising:
receiving, from a user in a graphical user interface presented on the user device, a depth request for depth information at a geolocation;
receiving, at least two satellite images including the geolocation, wherein difference in respective capture times of each of the satellite images is within a threshold;
providing, to a machine-learned river gauge model, the at least two satellite images for the geolocation;
determining, by the machine-learned river gauge model and utilizing the satellite images, depth information for the geolocation; and
providing, to the user in the graphical user interface, the depth information at the geolocation.

2. The system of claim 1, further comprising training the machine-learned river gauge model, the training comprising:
generating training data for a plurality of geographic locations, the generating of training data comprising:
receiving a plurality of river depth measurements collected by a plurality of river gauges at respective collection times, wherein each river gauge of the plurality of river gauges corresponds to a respective geographic location;
receiving a plurality of satellite images, wherein each satellite image includes a geographic location of the plurality of geographic locations and is captured at a respective capture time;
selecting, a first river depth measurement collected by a particular river gauge of a particular geographic location at a first collection time and a second river depth measurement collected by the particular river gauge of the particular geographic location at a second collection time, wherein a time difference between the first collection time and the second collection time meet a threshold collection period of time;
selecting, from the plurality of satellite images, a first satellite image for the first river depth measurement having a respective capture time meeting a first threshold;
selecting, from the plurality of satellite images, a second, different satellite image for the second river depth measurement having a respective capture time meeting a second threshold;
extracting, from the first satellite image and the second satellite image, a set of local inundation characteristics; and
generating, from the set of local inundation characteristics, the first river depth measurement and the second river depth measurement, training data; and
providing, to a machine-learned river gauge model, the training data.

3. The system of claim 1, wherein the satellite images including the geolocation comprise Landsat images.

4. The system of claim 1, wherein determining depth information for the geolocation comprises determining a change in depth of a river at the geolocation over a period of time defined by a difference in the capture times of each of the satellite images.

5. The system of claim 4, further comprising:
determining that the change in depth of the river at the geolocation over the period of time is indicative of a flooding condition; and
providing, to the user in the graphical user interface, the depth information at the geolocation including the indication of the flooding condition.

6. The system of claim 1, wherein providing, to the machine-learned river gauge model, the at least two satellite images for the geolocation comprises generating a query vector by extracting, from the at least two satellite images, local inundation characteristics.

7. The system of claim 6, wherein local inundation characteristics comprise changes to appearance of local features in the satellite images, and wherein extracting local inundation characteristics comprises generating an inference about water level changes based on changes to the appearance of local features.

8. The system of claim 1, further comprising:
receiving, from the user in the graphical user interface presented on the user device, a request for a navigational path along a river having a plurality of depth characteristics, the navigational path including a start point and an end point;
determining, for a set of geolocations located between the start point and the end point, depth information at each geolocation;
determining, the navigational path, wherein each geolocation point has an associated depth characteristic meeting a threshold depth;
and providing the navigational path.

9. The system of claim 8, wherein the navigational path is provided in a map interface in the graphical user interface presented on the user device.

10. A method comprising:
receiving, by a data processing apparatus and from a user in a graphical user interface presented on a user device, a depth request for depth information at a geolocation;
receiving, by the data processing apparatus, at least two satellite images including the geolocation, wherein difference in respective capture times of each of the satellite images is within a threshold;
providing, by the data processing apparatus and to a machine-learned river gauge model, the at least two satellite images for the geolocation;
determining, by the machine-learned river gauge model and utilizing the satellite images, depth information for the geolocation; and
providing, by the data processing apparatus and to the user in the graphical user interface, the depth information at the geolocation.

11. The method of claim 10, further comprising training the machine-learned river gauge model, the training comprising:
generating, by the data processing apparatus, training data for a plurality of geographic locations, the generating of training data comprising:
receiving a plurality of river depth measurements collected by a plurality of river gauges at respective collection times, wherein each river gauge of the plurality of river gauges corresponds to a respective geographic location;
receiving a plurality of satellite images, wherein each satellite image includes a geographic location of the plurality of geographic locations and is captured at a respective capture time;
selecting, a first river depth measurement collected by a particular river gauge of a particular geographic location at a first collection time and a second river depth measurement collected by the particular river gauge of the particular geographic location at a second collection time, wherein a time difference between the first collection time and the second collection time meet a threshold collection period of time;
selecting, from the plurality of satellite images, a first satellite image for the first river depth measurement having a respective capture time meeting a first threshold;
selecting, from the plurality of satellite images, a second, different image for the second river depth measurement having a respective capture time meeting a second threshold;
extracting, from the first satellite image and the second satellite image, a set of local inundation characteristics; and
generating, from the local inundation characteristics, the first river depth measurement and the second river depth measurement, training data; and
providing, by the data processing apparatus and to a machine-learned river gauge model, the training data.

12. The method of claim 10, wherein the satellite images including the geolocation comprise Landsat images.

13. The method of claim 10, wherein determining depth information for the geolocation comprises determining a change in depth of a river at the geolocation over a period of time defined by a difference in the capture times of each of the satellite images.

14. The method of claim 13, further comprising:
determining that the change in depth of the river at the geolocation over the period of time is indicative of a flooding condition; and
providing, to the user in the graphical user interface, the depth information at the geolocation including the indication of the flooding condition.

15. The method of claim 10, wherein providing, to the machine-learned river gauge model, the at least two satellite images for the geolocation comprises generating a query vector by extracting, from the at least two satellite images, local inundation characteristics.

16. The method of claim 15, wherein local inundation characteristics comprise changes to appearance of local features in the satellite images, and wherein extracting local inundation characteristics comprises generating an inference about water level changes based on changes to the appearance of local features.

17. The method of claim 10, further comprising:
receiving, from the user in the graphical user interface presented on the user device, a request for a navigational path along a river having a plurality of depth characteristics, the navigational path including a start point and an end point;
determining, for a set of geolocations located between the start point and the end point, depth information at each geolocation;
determining, the navigational path, wherein each geolocation point has an associated depth characteristic meeting a threshold depth;
and providing the navigational path.

18. The method of claim 17, wherein the navigational path is provided in a map interface in the graphical user interface presented on the user device.

19. A non-transitory computer storage medium encoded with a computer program, the computer program comprising instructions that when executed by a data processing apparatus cause the data processing apparatus to perform operations comprising:
- receiving, from a user in a graphical user interface presented on a user device, a depth request for depth information at a geolocation;
- receiving, at least two satellite images including the geolocation, wherein difference in respective capture times of each of the satellite images is within a threshold;
- providing, to a machine-learned river gauge model, the at least two satellite images for the geolocation;
- determining, by the machine-learned river gauge model and utilizing the satellite images, depth information for the geolocation; and
- providing, to the user in the graphical user interface, the depth information at the geolocation.

20. The non-transitory computer storage medium of claim 19, further comprising training the machine-learned river gauge model, the training comprising:
- generating training data for a plurality of geographic locations, the generating of training data comprising:
  - receiving a plurality of river depth measurements collected by a plurality of river gauges at respective collection times, wherein each river gauge of the plurality of river gauges corresponds to a respective geographic location;
  - receiving a plurality of satellite images, wherein each satellite image includes a geographic location of the plurality of geographic locations and is captured at a respective capture time;
  - selecting, a first river depth measurement collected by a particular river gauge of a particular geographic location at a first collection time and a second river depth measurement collected by the particular river gauge of the particular geographic location at a second collection time, wherein a time difference between the first collection time and the second collection time meet a threshold collection period of time;
  - selecting, from the plurality of satellite images, a first satellite image for the first river depth measurement having a respective capture time meeting a first threshold;
  - selecting, from the plurality of satellite images, a second, different image for the second river depth measurement having a respective capture time meeting a second threshold;
  - extracting, from the first satellite image and the second satellite image, a set of local inundation characteristics; and
  - generating, from the local inundation characteristics, the first river depth measurement and the second river depth measurement, training data; and
- providing, to a machine-learned river gauge model, the training data.

* * * * *